UNITED STATES PATENT OFFICE.

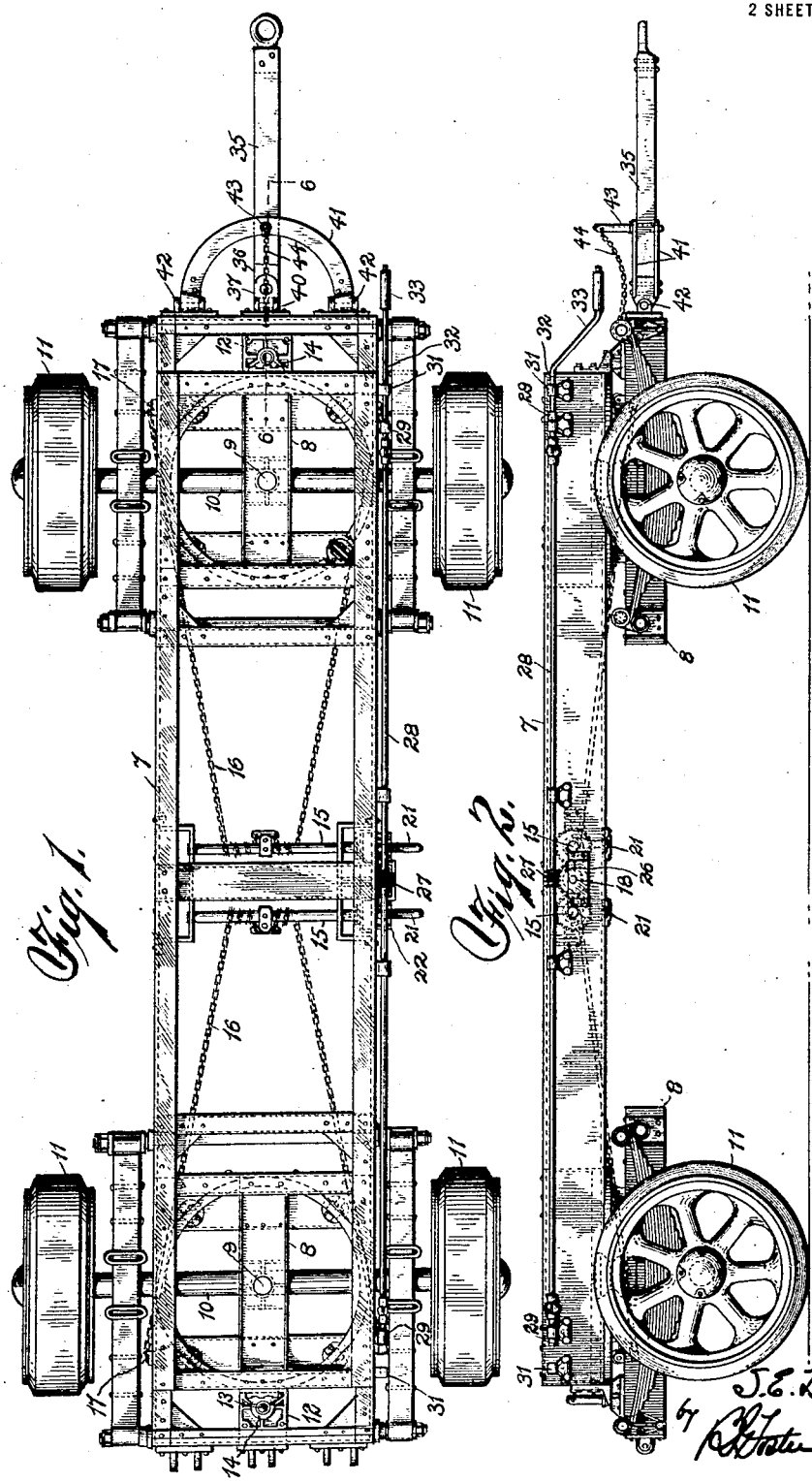

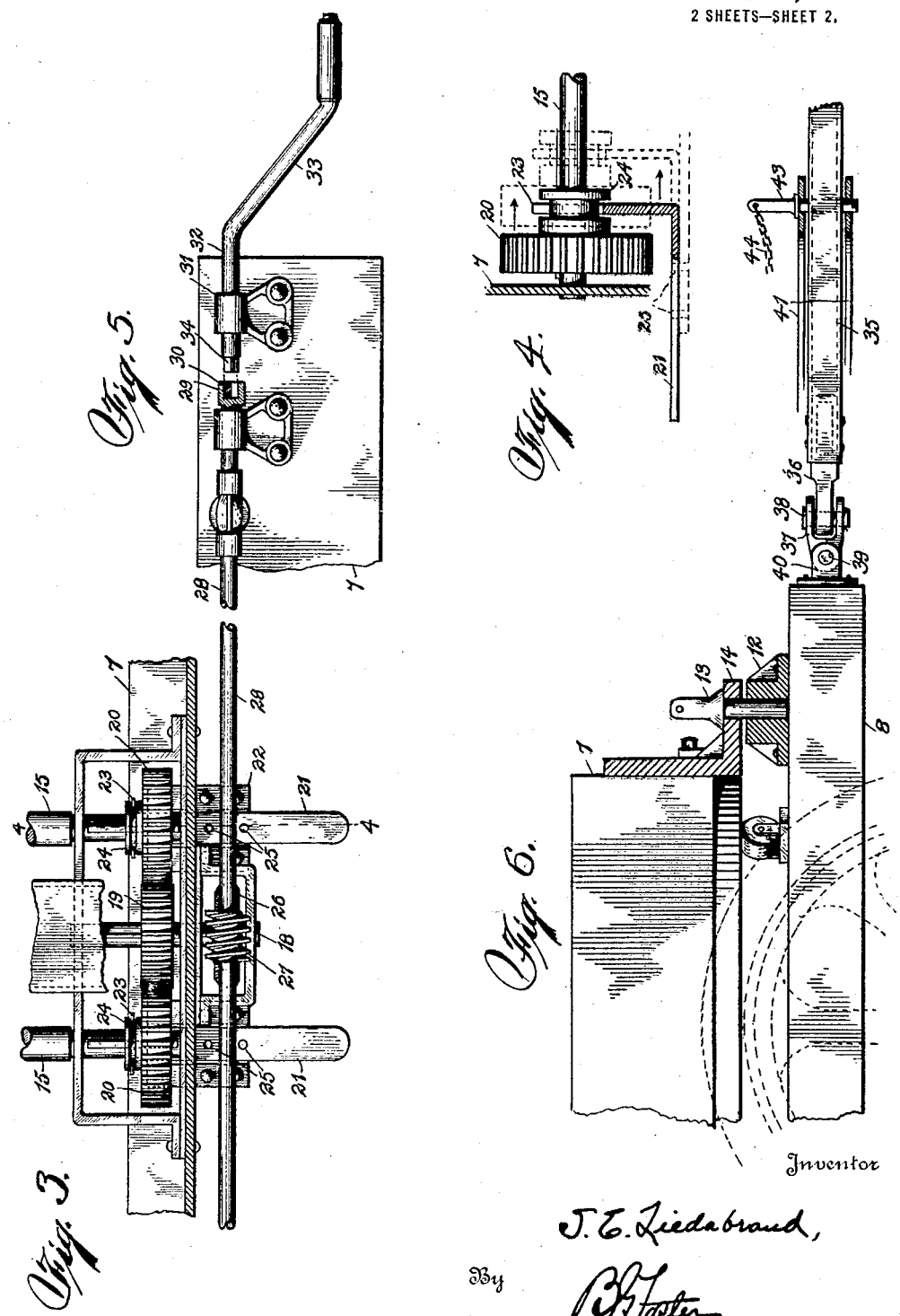

SAMUEL E. LIEDABRAND, OF SPRINGFIELD, ILLINOIS.

TRAILER.

1,417,846.  Specification of Letters Patent.  Patented May 30, 1922.

Application filed July 19, 1920. Serial No. 397,526.

*To all whom it may concern:*

Be it known that I, SAMUEL E. LIEDA-BRAND, a citizen of the United States, residing at Springfield, in the county of Sangamon and State of Illinois, have invented certain new and useful Improvements in Trailers, of which the following is a specification.

This invention relates to improvements in steering mechanism for automobile trailers, the object being to provide means whereby the steering movements and positions of the different wheels may be obtained to insure the proper positioning of the trailer under varying conditions.

In the accompanying drawings:—

Figure 1 is one embodiment of the invention,

Figure 2 is a side elevation of the same, Figure 3 is a detail horizontal sectional view through the gearing for the drums, Figure 4 is a sectional view on the line 4—4 of Figure 3, Figure 5 is a detail view in elevation, illustrating the handle crank coupling for the actuating shaft, Figure 6 is a detail sectional view on the line 6—6 of Figure 1.

In the embodiment disclosed, a main frame 7 is employed, which may be of any desired construction, and is supported at its ends by sub-frames 8 in the form of turntables pivotally connected, as illustrated at 9, to the end portions of the main frame, and carrying axles 10, on which wheels 11 are journaled. The sub-frames or turntables are preferably duplicates, arranged in reverse relation, and the end portions of the main frame are preferably of similar construction.
Both of the sub-frames can be held against turning movement, and to this end, each is provided at its outer end with a socket piece 12 adapted to receive a holding pin 13 that can be passed through the opening in a bracket 14 fixed on the end of the main frame, and illustrated in detail in Figure 6.

Journaled transversely on the central portion of the main frame 7 are drums 15, on each of which are reversely wrapped cable members preferably in the form of chains 16 that are connected to the opposite side portions of the sub-frames or turntables, as illustrated at 17. Thus, it will be evident that by rotating one of the drums in either of reverse directions, the sub-frame connected
thereto will be turned and the wheels canted with respect to the main frame.

Journaled between the drums at one end is a stub shaft 18 on which is fixed a gear wheel 19, and each of the drums 15 has feathered thereon a gear wheel 20 that is thus slidable into and out of mesh with the gear wheel 19. The movement is effected preferably by an actuating rod 21 slidably mounted in a bracket 22 on one of the side bars of the main frame 7, the rod having an upturned fork 23 engaged in the groove of a hub 24, forming a part of the gear wheel 20. The rod also is provided with openings 25 in which a holding pin can be engaged to secure the gear in positions where it is engaged with or disengaged from the gear 19. The outer end of the stub shaft has a worm wheel 26, and meshing therewith is a worm 27 carried by an actuating shaft 28 journaled longitudinally on the outer side of the main frame 7. This shaft 28 terminates at both ends in heads 29, having angular sockets 30. Alined with each end of the shaft is a bearing box 31 adapted to detachably receive the shaft portion 32 of a handle crank 33, said shaft portion having an angular terminal 34 that is adapted to engage in the sockets 30 of the heads 29.

The front sub-frame or turntable has a draft member in the form of a tongue 35 connected thereto by a universal coupling. To this end the tongue 35 has a projecting ear 36 engaged in a yoke 37 and held thereto by a vertical pivot 38. The yoke in turn has a horizontal pivotal connection 39 with a bracket 40 secured to the front end of the sub-frame 8. Semi-circular guide plates 41 are located on opposite sides of the tongue 35 and have horizontal pivotal connections 42 at their ends with the sub-frame 8 on opposite sides of the tongue connection. A pin 43, suitably secured to the sub-frame by a chain 44, is adapted to be passed through the central portion of the guides and through the tongue for the purpose of holding the latter centrally. When so held, it will be obvious that it can have an up and down movement, but that it is fixed against lateral movement with respect to the sub-frame.

It will be understood that the vehicle is primarily intended for use as a trailer for automobiles and the like. When the same is being towed by a vehicle connected to the front end of the tongue 35, the locking pin 43 is in place, as shown and the front gear wheel 20 is out of mesh with the driving gear 19. The tongue is thus held against lateral movement with respect to the front sub-frame, and it will be evident therefore that when said tongue is moved to one side or the other, as in turning a corner, the sub-frame turns on the king pin or pivot 9, and the wheels are correspondingly turned. In such forward movement, the rear sub-frame is locked against turning on the main frame by the pin 13, so that under towing conditions, the parts of the trailer have the usual fixed and movable relations.

In using the steering mechanism, for example, in backing up, if it is desired to steer with the front truck, the locking pin 43 is removed, thereby permitting the tongue to swing freely on the universal joint. The rear gear wheel 20 is thrown out of mesh with the gear wheel 16 and the front gear wheel 20 is thrown into mesh. Therefore when the motor truck or other power unit backs the trailer, by turning the handle crank the front roller shaft 15 is rotated, and the front sub-frame can be turned, as desired. The front truck is thus made to guide the trailer during the backing movement. If it is desired to back up and steer with the rear truck, the front truck or sub-frame is locked in its central position by inserting the pin 13 in the parts 14 and 12, but the tongue is allowed to move freely in any direction. The front gear wheel 20 is then thrown out of mesh with the driving shaft 19 and the rear gear wheel 20 is thrown into mesh with said driving gear 19. The rear truck or sub-frame is now free to turn and is controlled from the actuating shaft by operating the crank 33. If it is desired to steer with all four wheels, both sub-frames are left free to turn and both of the gear wheels 20 are placed in mesh with the gear wheel 19, whereupon both sub-frames will be simultaneously turned upon the operation of the actuating shaft 28. This method of steering backward gives a short turning radius.

It will thus be evident that a number of advantages are obtained. In backing the trailer may be steered independently of the towing tongue and the latter being rendered flexible, the power truck may assume a position out of alinement with the trailer. Moreover, as already shown, the trailer may be steered by means of the front two wheels or by means of the rear wheels, or by all four wheels. The operator additionally may be located at either end of the trailer, and consequently may face in the direction of backing and thereby guide the trailer independently and with safety to himself. Furthermore when steering the wheels will rigidly maintain the positions in which they are placed, as the worm constitutes a lock, preventing any accidental alteration in the parts when adjusted.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In steering mechanism of the character set forth, the combination with a vehicle frame, of front and rear sets of wheels pivotally mounted thereon, two transverse shafts mounted on said frame, connecting means between each shaft and one of said sets of wheels, a single actuating member, and means for connecting the actuating member to either shaft at will to turn either set of wheels independently of the other.

2. In steering mechanism of the character set forth, the combination with a vehicle frame, of front and rear sets of wheels pivotally mounted thereon, two transverse shafts mounted on said frame, connecting means between each shaft and one of said sets of wheels, a single actuating member, and means for connecting said member to either shaft separately or to both shafts to turn either set of wheels independently of the other, or to turn both sets of wheels simultaneously.

3. In steering mechanism of the character set forth, the combination with a vehicle frame, of front and rear sets of wheels pivotally mounted thereon, a drum for each set of wheels journaled on the frame, cables between the drums and the respective sets of wheels, a rotatable actuating device, and means for connecting the actuating device to either drum independently or to both drum simultaneously to correspondingly turn the sets of wheels.

4. In steering mechanism of the character set forth, the combination with a vehicle frame, of front and rear sets of wheels pivotally mounted thereon, a drum for each set of wheels journaled on the frame, cables between the drums and the respective sets of wheels, a rotatable actuating gear, and gears on the drum independently movable into and out of coaction with the actuating gear to transmit motion therefrom to the drums either separately or simultaneously.

5. In steering mechanism of the character set forth, the combination with a vehicle frame, of front and rear turn-tables having pivotal connection therewith, means for holding either turntable against its pivotal movement, independently rotatable drums, cables wrapped on the drums and connected respectively to the turntables, and common means for actuating the drums independently.

6. In steering mechanism of the character set forth, the combination with a vehicle frame, of front and rear wheel carrying turntables journaled thereon, drums, cables extending from the turntables to the drums respectively, an actuating shaft journaled longitudinally on the frame, gears for each of the drums, a gear driven by the shaft, and means for connecting the driven gears either separately or simultaneously to the shaft gear.

7. In steering mechanism of the character set forth, the combination with a vehicle frame, of front and rear wheel carrying turntables journaled thereon, drums, cables extending from the turntables to the drums respectively, an actuating shaft journaled longitudinally on the frame, gearing between the shaft and drums for operating either drum independently or both simultaneously from the shaft, and means for securing either of the turntables against turning.

8. In steering mechanism of the character set forth, the combination with a vehicle frame, of front and rear wheel-carrying turntables journaled on the frame, drums journaled between the turntables, a cable connection between the front turntable and one drum, a cable connection between the rear turntable and the other drum, an actuating shaft extending longitudinally of the frame, and having means whereby it may be operated from either end, a gear driven by the shaft, gears connected to the drum and separately movable into mesh with the shaft driven gear to operate either drum independently of the other or both simultaneously, and means for securing either turntable against rotatable movement.

In testimony whereof, I affix my signature in the presence of two witnesses.

SAMUEL E. LIEDABRAND.

Witnesses:
  H. S. DICKERMAN,
  D. M. WALSH.